(12) United States Patent
Doll et al.

(10) Patent No.: US 7,164,980 B1
(45) Date of Patent: Jan. 16, 2007

(54) CONTROL ARCHITECTURE AND METHOD FOR INTEGRATING VEHICLE STABILITY CONTROL FUNCTIONS WITH REAR WHEEL STEERING CONTROL FUNCTIONS IN A MOTOR VEHICLE

(75) Inventors: Kenneth A. Doll, Ann Arbor, MI (US); Danny R. Milot, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 311 days.

(21) Appl. No.: 10/655,109

(22) Filed: Sep. 4, 2003

(51) Int. Cl.
*G06F 7/70* (2006.01)

(52) U.S. Cl. .................. 701/48; 701/36; 303/146

(58) Field of Classification Search .................. 701/1, 701/3, 36, 41, 42, 51, 48, 55, 56, 57, 67, 701/68, 70–79, 2; 180/197; 303/140, 146, 303/147
See application file for complete search history.

(56) References Cited

U.S. PATENT DOCUMENTS

| | | | |
|---|---|---|---|
| 5,348,111 A | 9/1994 | Williams et al. | |
| 5,734,570 A | 3/1998 | Arlandis | |
| 6,453,226 B1 | 9/2002 | Hac et al. | |
| 6,466,857 B1 | 10/2002 | Belvo | |
| 6,481,806 B1 | 11/2002 | Krueger et al. | |
| 6,499,559 B1 | 12/2002 | McCann et al. | |
| 6,546,324 B1 | 4/2003 | Chen et al. | |
| 6,567,731 B1 | 5/2003 | Chandy | |
| 6,604,026 B1 | 8/2003 | Schmitt | |
| 6,721,636 B1* | 4/2004 | Gade | 701/1 |
| 6,799,092 B1* | 9/2004 | Lu et al. | 701/1 |
| 6,819,998 B1* | 11/2004 | Lin et al. | 701/70 |
| 6,856,877 B1* | 2/2005 | Coelingh et al. | 701/48 |
| 6,856,885 B1* | 2/2005 | Lin et al. | 701/70 |
| 6,856,886 B1* | 2/2005 | Chen et al. | 701/70 |
| 2002/0042671 A1 | 4/2002 | Chen et al. | |

FOREIGN PATENT DOCUMENTS

WO 90/14980 12/1990

\* cited by examiner

*Primary Examiner*—Richard M. Camby
(74) *Attorney, Agent, or Firm*—MacMillan, Sobanski & Todd, LLC (57) ABSTRACT

An apparatus and control method for a motor vehicle having steerable front and rear wheels and an associated wheel brake for each wheel. The apparatus and control method includes a sensor for generating a vehicle dynamic state signal based upon a sensed vehicle dynamic state of the vehicle. A vehicle stability control system is provided to control the selective braking of the wheel brakes of the vehicle based, at least in part, upon the vehicle dynamic state signal. A rear wheel steering system for controlling steering of the rear wheels based, at least in part, upon the vehicle dynamic state signal is also provided.

5 Claims, 7 Drawing Sheets

CONTROL ARCHITECTURE AND METHOD FOR INTEGRATING VEHICLE STABILITY CONTROL FUNCTIONS WITH REAR WHEEL STEERING CONTROL FUNCTIONS IN A MOTOR VEHICLE

TECHNICAL FIELD OF THE INVENTION

This invention relates in general to a control architecture for simultaneously controlling a rear wheel steering system and a vehicle stability control system in a motor vehicle.

Steering and braking systems for assisting a driver to control a motor vehicle under undesirable conditions are well known in the art. To aid the operator in maintaining the desired trajectory of the vehicle, Vehicle Stability Control (VSC) systems are known that apply selective wheel brake pressures and selectively reduce engine drive torque to maintain the vehicle's path under less than optimal conditions. The use of VSC systems will usually only be maintained above a specified threshold value.

Rear Wheel Steering (RWS) systems can also aid a driver in maintaining a desired trajectory for a vehicle. RWS systems operate the steerable rear wheels of the vehicle in conjunction with the steerable front wheels of the vehicle to maintain the vehicle's path. An RWS system is able to continuously operate because adjusting steering is generally undetectable to the driver. However, typically the success of an RWS system in maintaining a vehicle's path is limited. Steering correction can only overcome the physical forces that cause the vehicle to stray from its desired path up to a certain threshold value of vehicle tire adhesion.

It is known that both VSC and RWS systems utilize a variety of vehicle dynamic state data to generate an estimated vehicle dynamic state for the vehicle. The estimated vehicle dynamic state may be determined using any number of vehicle dynamics data inputs, as well as external parameters that may have an affect on the dynamic state of the vehicle. For example, U.S. Pat. No. 6,604,026 to Schmitt illustrates a method and system for determining the estimated vehicle dynamic state of a vehicle that incorporates both vehicle dynamic state data as well as external parameters into the estimated vehicle dynamic state model. From this estimated vehicle dynamic state, control commands determine the corrective action of the respective system. Examples of vehicle dynamic state data that have been or may be used to control VSC systems or RWS systems include front steering angle, individual wheel velocities, lateral acceleration, and yaw rate. Generally, VSC systems utilize many of these vehicle dynamic state data inputs to develop one model of the estimated vehicle dynamic state. Conversely, RWS systems generally utilize fewer vehicle dynamic state data inputs, which may lead to a different estimated vehicle dynamic state than the vehicle dynamic state determined by the VSC system. Where VSC and RWS systems are used simultaneously on a vehicle, this difference in the estimated vehicle dynamic state calculated by the individual systems may lead to insufficient, excessive, or counterproductive vehicle correction that, when combined, does not maintain the desired trajectory of the vehicle.

Another past source of disparity between the systems has occurred where the individual vehicle dynamic state measurements used to determine the estimated vehicle dynamic state are separately determined for both the VSC and RWS systems. For example, in the past, the yaw rate measurement has been separately determined for both the VSC and RWS systems. The VSC and RWS systems, based upon each system's individual yaw rate measurement, each generate a separate control command that govern the corrective actions taken by each system. Ideally, where the yaw rate measurements for both the VSC and RWS system are generally the same, the individual control units for both the VSC and RWS systems can be designed to mathematically limit the control commands that dictate the corrective forces applied by each system independently and subsequently limit the resultant contribution of each system to account for the operation of the other system. However, when the individual yaw rate measurements for both the VSC and the RWS system are not generally the same, as may occur due to factors such as calibration drift of the different yaw rate sensors, the balance of the control commands is disturbed. As a result of the difference between the VSC yaw rate measurement and the RWS yaw rate measurement, each individual system may again provide insufficient or excessive vehicle correction that when combined, the result is that the vehicle does not maintain the desired trajectory of the vehicle.

SUMMARY OF THE INVENTION

It has been realized that it would be advantageous to develop a system architecture that integrates the VSC and RWS systems by using a common set of vehicle dynamic state data as inputs to control the VSC and RWS systems. More specifically, in one embodiment, it would be advantageous to integrate the VSC and RWS systems by using a common set of vehicle dynamic state data to determine an open loop control command in the rear wheel steering system, which is then used as an input to a closed loop control command in the VSC system to provide a common vehicle dynamic state reference between the two systems.

This invention relates to an integrated vehicle steering and braking control architecture for a vehicle having steerable rear wheels. In one embodiment, the system includes a plurality of sensors for detecting vehicle dynamics data, and also includes a steering angle sensor for generating a front steering angle measurement signal. A VSC system for controlling selective braking operations of the wheels of the vehicle generates a vehicle velocity measurement based upon the vehicle dynamics data. A closed loop rear steer command is also calculated by the VSC system, based upon both the vehicle dynamics data and an open loop rear steer command. A rear wheel steering control system is also provided for controlling the steering angle of the rear wheels of the vehicle. The rear wheel steering control calculates the open loop rear steer command based upon the vehicle velocity measurement generated by the VSC system and also upon the front steering angle measurement. The open loop rear steer command is transmitted in a feedback operation to the VSC system, which integrates the operation of the RWS system and the VSC system. The feedback of the open loop steer command prevents the two systems from counteracting one another because the open loop rear steer command serves as an input variable to the closed loop rear steer command output of the VSC system, with both the open loop rear steer command and the closed loop rear steer command being based upon a common vehicle state reference signal. The RWS control system then generates a rear steer signal that is transmitted to steering control devices that control the steering angle of the rear wheels of the vehicle.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
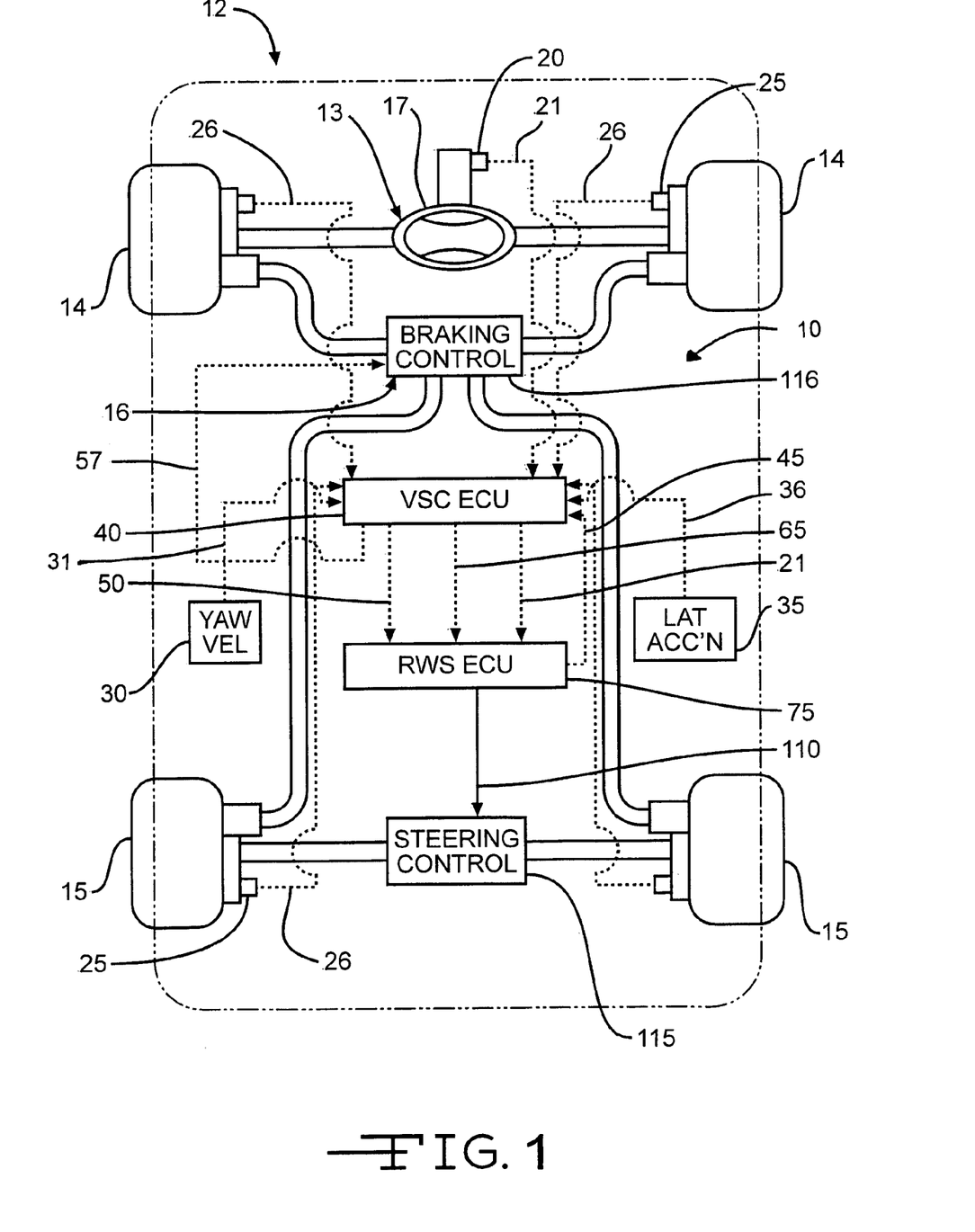
FIG. 1 is a schematic diagram of a motor vehicle with an integrated control architecture according to the present invention.
Figure 2:
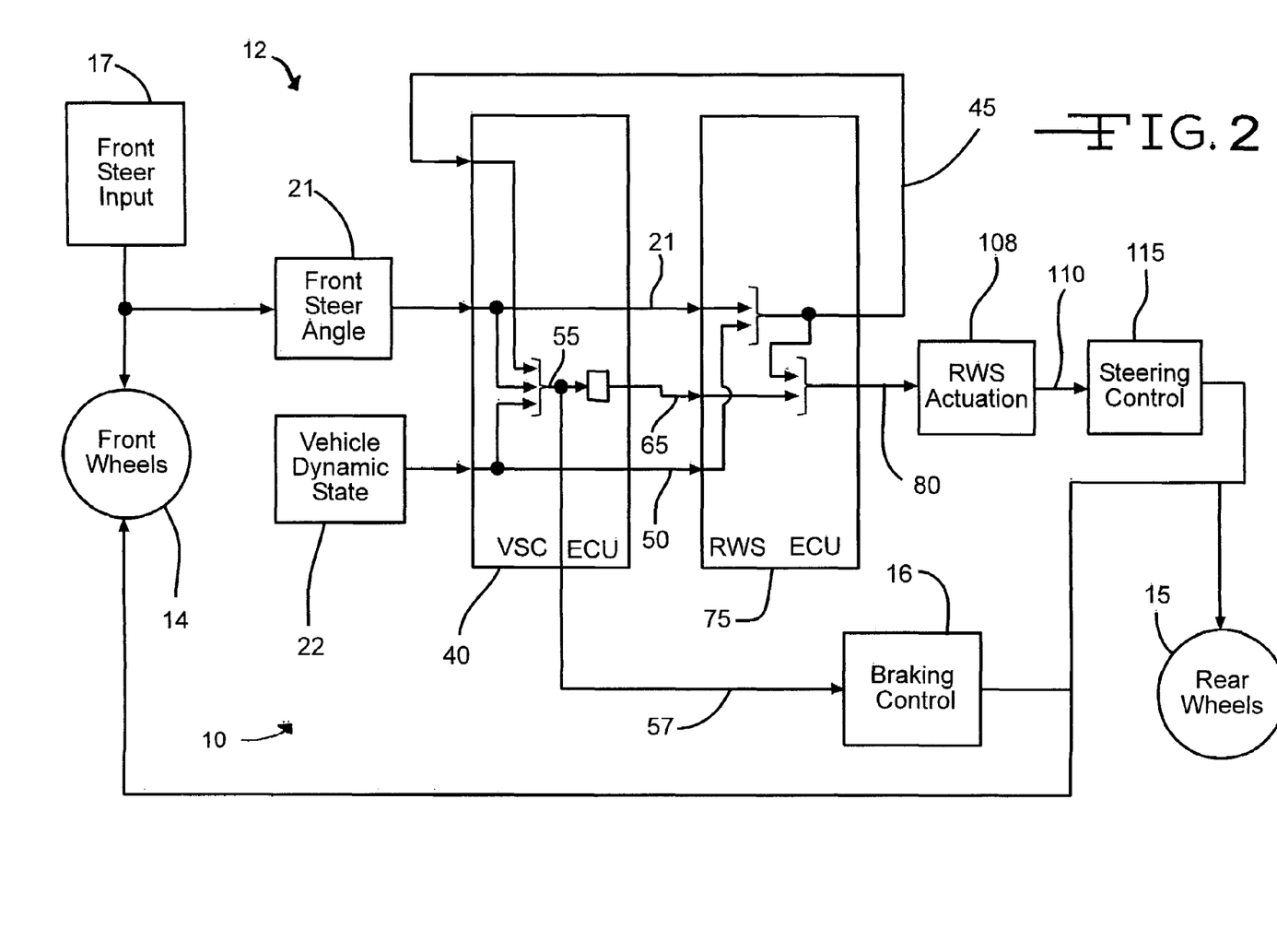
FIG. 2 is a schematic diagram of the integrated vehicle stability control and rear wheel steering control system according to the present invention for a motor vehicle.

Referring now to the drawings, there is illustrated in FIGS. 1 and 2 a motor vehicle 12 containing the integrated control architecture 10 of the present invention. The integrated vehicle steering and braking control architecture 10 is used in a vehicle 12 having a steering system 13 having one or more operator steered front wheels 14 as well as one or more steerable rear wheels 15. The steering system 13 is primarily controlled by a driver controlled steering input device 17, with supplemental control capabilities provided by the control architecture 10 of the present invention. The vehicle 12 also includes a braking system 16 of any suitable configuration that serves to reduce the rotational velocity of both the front steerable wheels 14 and the rear steerable wheels 15 in response to an operator controlled braking device (not shown), and also in response to the control architecture 10 of the present invention.

Figure 6:
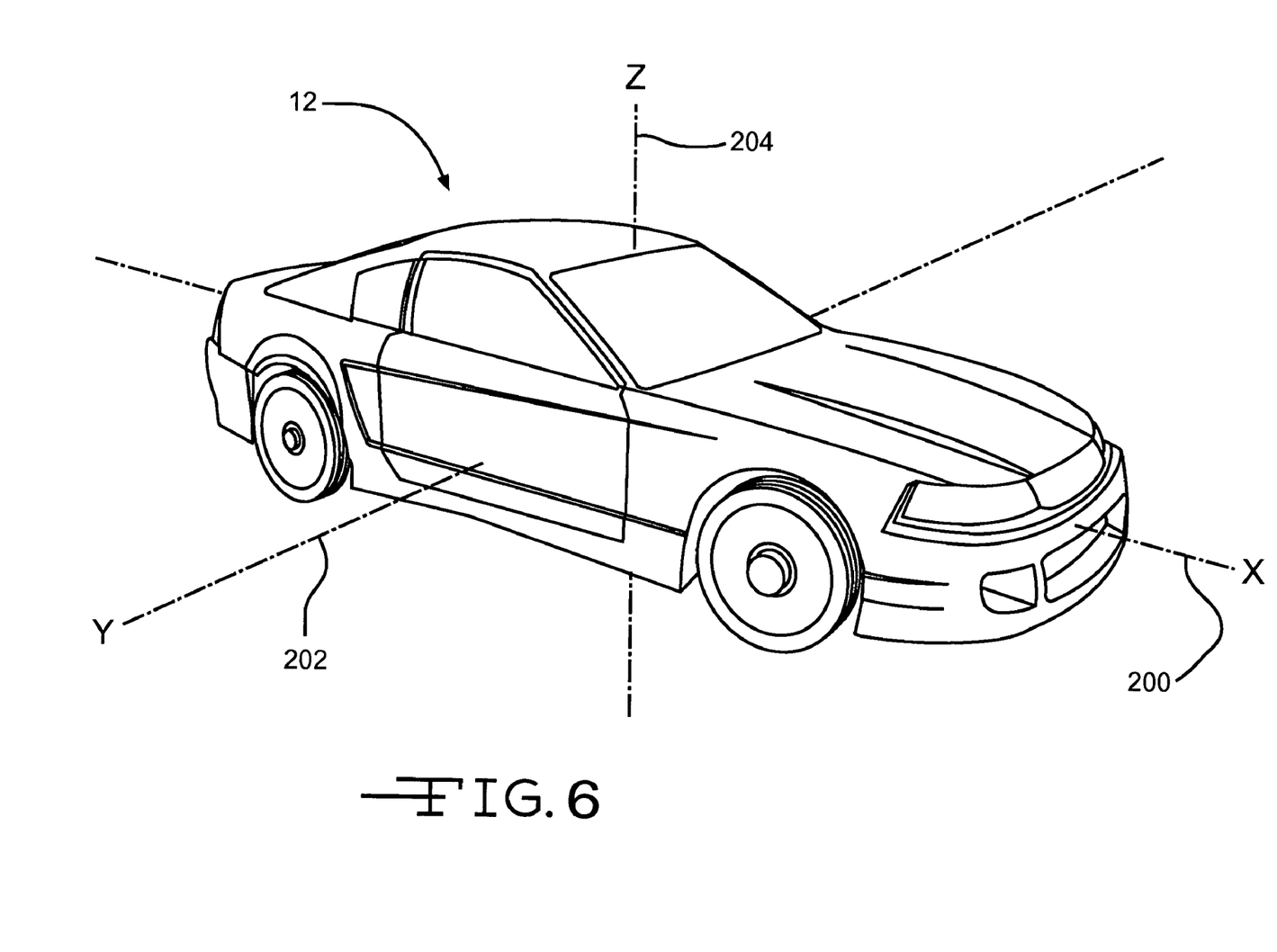
FIG. 6 is a perspective view of a motor vehicle illustrating the axes of movement relevant to the vehicle dynamic state measurements utilized in the control architecture of the present invention.

As seen in FIG. 6, the vehicle 12 is shown in reference to three axes that are relevant for determining vehicle dynamic state data that contributes to the control architecture 10 of the present invention. One of the three axes is the longitudinally extending x-axis 200. Rotation of the vehicle 12 about the x-axis 200 is generally referred to as the roll of the vehicle 12. The second of the three axes is the transversely extending y-axis 202. Rotation of the vehicle 12 about the y-axis 202 is generally referred to as the pitch of the vehicle 12. Acceleration of the vehicle 12 along the y-axis 202 is referred to as lateral acceleration. The final axis is the z-axis 204. Rotation of the vehicle 12 about the z-axis 204 is generally referred to as the yaw of the vehicle 12.

Referring back to FIGS. 1 and 2, the control architecture 10 includes a plurality of sensors for generating data about the dynamic state of the vehicle 12 in the form of sensor signals representative of various sensed vehicle conditions. For example, a steering angle sensor 20 is provided to measure the position of the steering input device 17 and subsequently generates a front steering angle measurement signal 21. The steering angle sensor 20 may be mounted in any suitable location for determining the steering angle of the steering input device 17. A plurality of wheel speed sensors 25 that may be positioned at the front wheels 14 and at the rear wheels 15 of the vehicle 12 to determine velocity measurements 26 for each of the individual front wheels 14 and rear wheels 15 are also provided. Wheel acceleration may be calculated by observing the wheel velocity measurements 26 over time. The vehicle dynamic state sensors also include a yaw velocity sensor 30, which measures the rate of rotation of the vehicle 12 about its z-axis 204, and provides a yaw velocity measurement signal 31 for the vehicle 12. A lateral acceleration sensor 35 may also be included, which measures the lateral acceleration of the vehicle 12, and provides a lateral acceleration measurement signal 36 for the vehicle 12. It will be appreciated that additional sensors may also be included to record additional dynamic state data, although such is not required. Such suitable sensors may be provided to develop signals indicative of velocity, acceleration, or rate of change of acceleration of the vehicle 12 about or along any of the x-axis 200, the y-axis 202, and/or the z-axis 204, or combination thereof, including those resulting in simultaneous movement of the vehicle 12 along and/or about two or three of the axes 200, 202, 204. Additionally, vehicle wheel rotational speed and wheel acceleration may be sensed. Such vehicle state sensors may be of any suitable type, including, but not limited to, such conventional sensors as electromechanical accelerometers, electromagnetic speed pick-up detection devices, or more exotic sensors, such as ground detecting radar devices.

FIG. 2 illustrates the macro function of the control architecture 10. The front steering angle 21 and vehicle dynamic state data 22 determined by the various sensors are provided as inputs to a first electronic control unit 40. The first electronic control unit 40 may be located in any suitable location for facilitating the control functions assigned to the first electronic control unit 40. In a preferred embodiment, the first electronic control unit 40 (e.g., VSC ECU) is mounted on the brake modulator (not shown), which may be a component of the braking control system 16 of the vehicle 12. The sensory data is provided to the first electronic control unit 40 by any suitable data transmission mechanism. Preferably, the first electronic control unit 40 controls the VSC operations of the vehicle 12, although it will be appreciated that the sensory data may be provided to any suitable programmable control device. In addition to the sensory data provided to the first electronic control unit 40, a calculated open loop rear steer command 45 is also provided through a feedback operation as an input to the first electronic control unit 40. The calculation of the open loop rear steer command 45 will be described in detail below. The first electronic control unit 40 then processes the front steering angle measurement signal 21, the vehicle dynamic state data 22, and the open loop rear steer command 45 to yield several intermediate data values as well as at least one calculated output. One such calculated output is a closed loop rear steer command 65. The closed loop rear steer command 65 is preferably a gain scheduled calculation representing the necessary rear wheel 15 phase adjustment necessary to maintain the desired trajectory of the vehicle 12. The calculation of the closed loop rear steer command 65 will also be described in more detail below. Prior to the completion of the gain scheduling mathematical analysis yielding the closed loop rear steer command 65, a vehicle state error signal 52 combining the front steering angle measurement 21, the vehicle dynamic state data 22, and the open loop rear steer command 45 is also provided as a calculated output to the braking control systems 16 of the vehicle 12 in conjunction with the vehicle stability control operations controlled by the first electronic control unit 40. Additionally, an average vehicle velocity estimation 50 calculated from the vehicle dynamic state data 22, as well as the front steering angle measurement 21, are provided as outputs of the first electronic control unit 40.

The front steering angle measurement signal 21, the closed loop rear steer command 65, and the vehicle velocity estimation calculation 50 output from the first electronic control unit 40 are then provided as inputs to a second electronic control unit 75 (e.g., RWS ECU). The second electronic control unit 75 may be located in any suitable location for facilitating the control functions assigned to the second electronic control unit 75. In a preferred embodiment, the second electronic control unit 75 is located with the steering control module (not shown), which is a component of a steering control system 115. The steering control system 115 controls the operation of the steering system 13 in conjunction with the control architecture 10 of the present invention. The data is provided from the first electronic control unit 40 to the second electronic control unit 75 and braking control systems 16 by any suitable data transmission mechanism. Preferably, the second electronic control unit 75 controls the RWS operations of the vehicle 12, although it will be appreciated that the data may be provided to any suitable programmable control device. The second electronic control unit 75 processes the front steering angle measurement signal 21 and the vehicle velocity estimation calculation 50 to create several calculated outputs. One such calculated output is the open loop rear steer command 45, which is a measurement of the vehicle dynamic state change necessary to maintain the desired trajectory of the vehicle 12. Another calculated output calculated by the second control unit 75 is the total rear steer command 80, which is calculated by combining the closed loop rear steer command 65 with the open loop rear steer command 45. The total rear steer command 80 then serves as an input to a series of RWS actuation mechanisms 108. The operation of the RWS actuation mechanisms 108 will be described in more detail below. The RWS actuation mechanisms 108 perform a series of mathematical comparisons between desired operational state values and actual operational state values to generate a rear steer motor voltage signal 110. The rear steer motor voltage signal 110 is supplied to the steering control systems 115 of the vehicle 12 to alter the phase orientation of the steerable rear wheels 15 of the vehicle 12 in order to maintain the desired trajectory of the vehicle 12.

Figure 3:
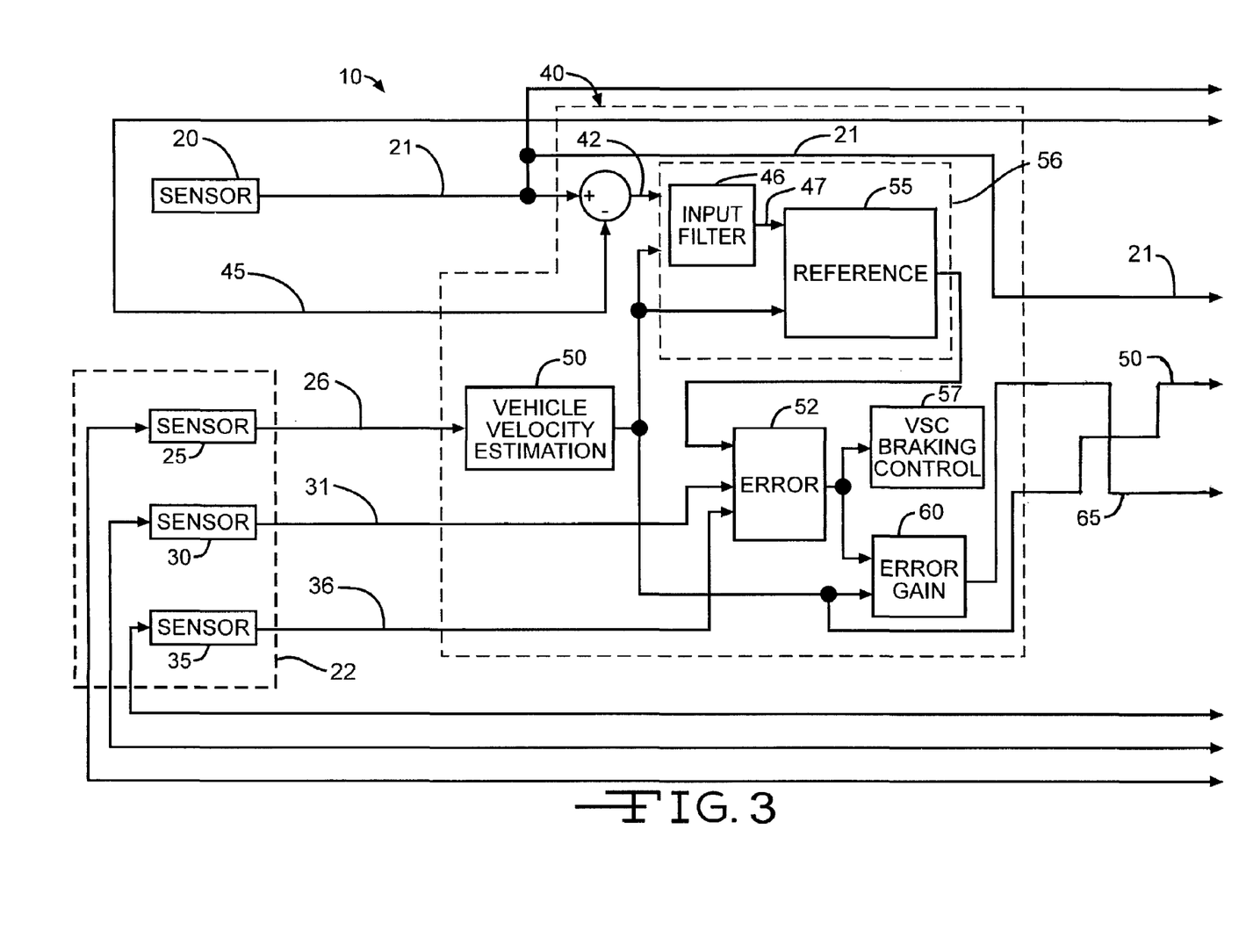
FIG. 3 is a partial schematic diagram of the control architecture of the present invention showing an electronic control unit for controlling vehicle stability control functions.

FIG. 3 illustrates the operation of the first electronic control unit 40. The first electronic control unit 40 receives sensory data, including a front steering angle measurement signal 21 from the front steering angle sensor 20, and sensory data reflecting the vehicle dynamic state 22. The vehicle dynamic state data 22 includes, but is not limited to, the individual tire wheel velocities 26 from the plurality of wheel speed sensors 25, a yaw velocity measurement 31 from the yaw rate sensor 30, and a lateral acceleration measurement 36 from the lateral acceleration sensor 35. In addition to the sensory data, the first electronic control unit 40 receives the calculated open loop rear steer command 45 from the second electronic control unit 75. Using the front steering angle measurement signal 21 and the open loop rear steer command 45, the first electronic control unit 40 generates a first steering delta signal 42, which represents the relational difference between the front steering angle measurement signal 21 and the open loop rear steer command signal 45. It will be appreciated, however, that any suitable mathematical algorithm may be applied to determine the first steering delta signal 42. The first electronic control unit 40 also generates a vehicle velocity estimate signal 50. The vehicle velocity estimate signal 50 is determined by combining the vehicle dynamic state data 22 according to any suitable mathematical algorithm for determining the average velocity of the vehicle 12.

Following the preliminary data calculation of the first steering delta signal 42 and the vehicle velocity estimate signal 50, the first steering delta signal 42 and the vehicle velocity estimate signal 50 are used as inputs to a dynamic reference function 56, which calculates a vehicle state reference signal 55. The dynamic reference function 56 calculates the vehicle state reference signal 55 using any suitable algorithm or series of algorithms that uses the first steering delta signal 42 and the vehicle velocity estimate signal 50 to determine a dynamic reference signal representing the desired motion of the vehicle 12. The algorithm may also incorporate additional vehicle dynamic state data 22 for calculating the vehicle state reference signal 55, although such is not required. A purpose of the dynamic reference function 56 is to perform a limiting function, which limits the maximum rate of change of the first steering delta signal 42 relative to a velocity-dependent value, where the velocity-dependent value is a factor of the magnitude of the vehicle velocity estimate signal 50. By limiting the maximum rate of change of the first steering delta signal 42, the magnitude of the vehicle 12 response to driver controlled input using the steering input device 17 is subsequently limited.

In a preferred embodiment, an input filter 46 is used to perform the limiting function, which subsequently minimizes sudden movement of the vehicle 12 in response to driver controlled steering input 17. The output of the input filter 46 is a first intermediate value 47 that is then used to generate the vehicle state reference signal 55. The vehicle state reference signal 55 is calculated using any suitable algorithm using the first intermediate data value 47 and the vehicle velocity estimate signal 50. The algorithm may also incorporate additional vehicle dynamic state data 22 for calculating the vehicle state reference signal 55, although such is not required. In a preferred embodiment, a gain scheduling algorithm is used to determine a dynamic reference signal representing the desired motion of the vehicle 12.

The vehicle state reference signal 55 is then used to generate a vehicle state error signal 52. The vehicle state error signal 52 is calculated using any suitable algorithm that measures the difference between the vehicle state reference signal 55 and the vehicle dynamic state data 22. Preferably, the vehicle dynamic state data 22 used for the vehicle state error signal 52 includes the yaw velocity measurement signal 31 and the lateral acceleration measurement signal 36. It will appreciated that any suitable vehicle dynamic state data 22 may serve as an input to an algorithm for determining the vehicle state error signal 52. The vehicle state error signal 52 may then used as an input to a differential braking subroutine 57 in the first electronic control unit 40, which is in turn provided to the braking control system 16 of the vehicle 12. The differential braking subroutine 57 preferably relates to the vehicle stability control function of the first electronic control unit 40, and applies selective wheel brake pressures to maintain the path of the vehicle 12 under less than optimal conditions.

The vehicle state error signal 52 is also used for generating an error gain signal 60. The error gain signal 60 is calculated using any suitable algorithm that uses the vehicle velocity estimate signal 50 and the vehicle state error signal 52. In a preferred embodiment, a gain scheduling algorithm incorporating the vehicle velocity estimate signal 50 and the vehicle state error signal 52 is used. The goal of the error gain signal 60 is to provide a high rate of response of the vehicle 12 to external disturbances, while simultaneously limiting the response to the driver controlled steering input 17. Although limiting the response of the vehicle 12 to driver input, the rate of the vehicle response to driver input will remain faster than typical vehicle response rates to driver input. Preferably, the vehicle response rate to driver input will be within the range of from about 0.1 to about 2 Hertz. The closed loop rear steer command 65 is generated based upon this error gain signal 60. The closed loop rear steer command 65 represents the necessary rear wheel 15 phase adjustment necessary to maintain the desired trajectory of the vehicle 12.

Figure 3A:
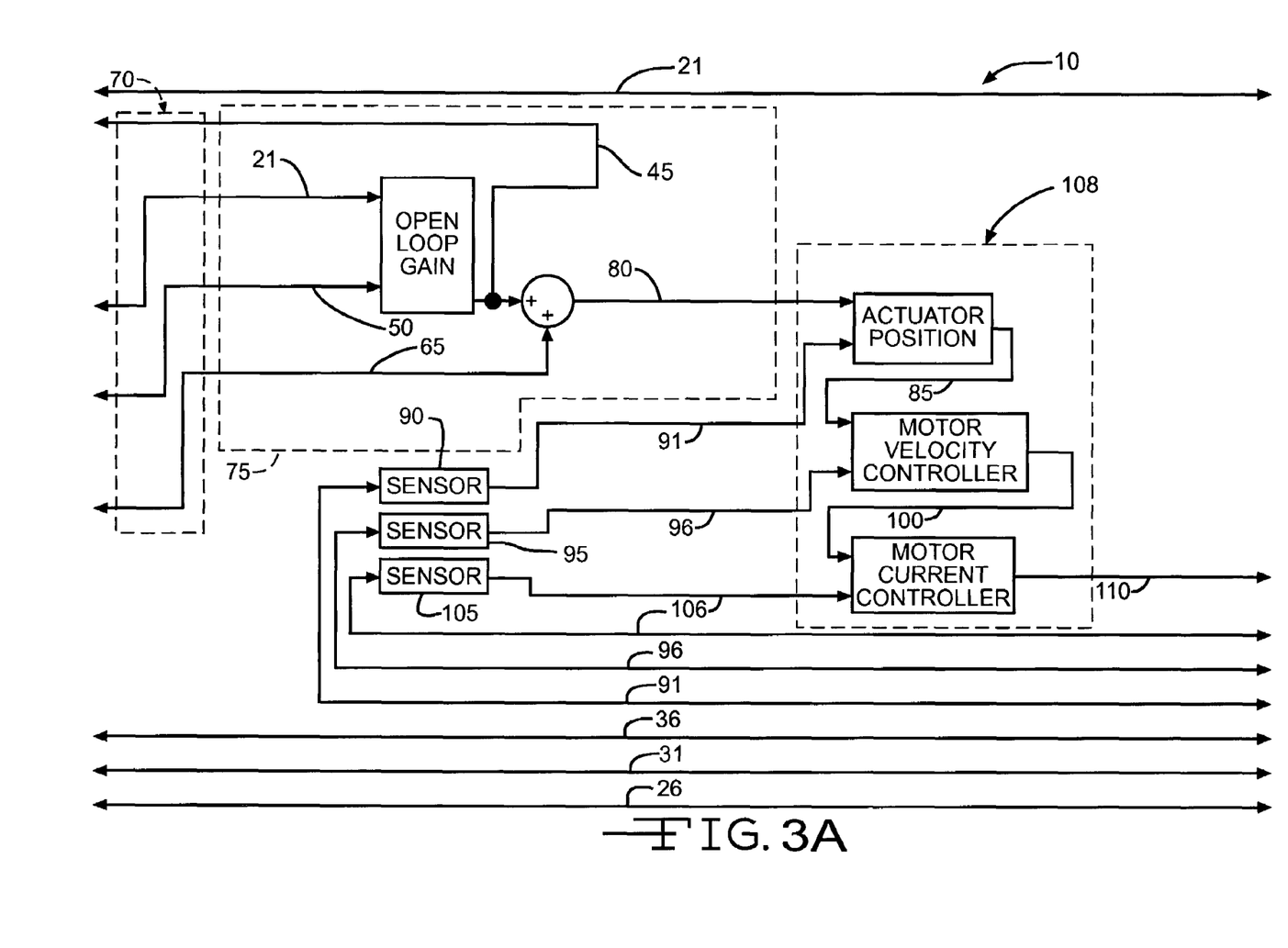
FIG. 3A is a partial schematic diagram of the control architecture of the present invention showing an electronic control unit and actuation mechanism for controlling rear wheel steering control functions.

FIG. 3A illustrates the second electronic control unit 75 and the RWS actuation sequence 108 used in the control architecture 10. The front steering angle measurement 21 provided by the front steering angle sensor 20, as well as the calculated vehicle velocity estimate signal 50 and the calculated closed loop rear steer command 65 are provided as inputs to the second electronic control unit 75. The data may be transmitted over any suitable communication network, shown generally at 70. It will be appreciated that a suitable communication network, as used in this application, refers to any suitable arrangement for facilitating the transfer of data. Examples of such suitable communication networks include, but are not limited to, analog or digital pulse width modulation on a single wire, digital serial or parallel busses, multiple parallel communication paths, communication via shared RAM, and radio frequency or optical communication systems. The second electronic control unit 75 uses the vehicle velocity estimate signal 50 and the front steering angle measurement 21 to generate the open loop rear steer command 45. The open loop rear steer command 45 is calculated using any suitable mathematical algorithm that combines the vehicle velocity estimate signal 50 and the front steering angle measurement signal 21. In a preferred embodiment, the open loop rear steer command 45 is calculated using any suitable gain scheduling algorithm which combines the vehicle velocity estimate signal 50 and front steering angle measurement signal 21 to yield the open loop rear steer command 45. The open loop rear steer command 45 is transmitted through the communication network 70 in a feedback transmission to the first electronic control unit 40 to serve as an input to the closed loop rear steer command 65. By providing the open loop rear steer command 45 to the first electronic control unit 40, which subsequently calculates the closed loop rear steer command 65 by incorporating the open loop rear steer command 45, the first electronic control unit 40 controlling VSC functions and the second electronic control unit 75 controlling RWS functions are both operating using calculations based upon a common yaw rate reference 55 for determining the corrective measures of each respective system. A particular advantage of the present invention is that by controlling based upon a common yaw rate reference 55, the corrective measures executed by the VSC first electronic control unit 40 and the corrective measures executed by the RWS second electronic control unit 75 cooperate with one another to maintain the desired trajectory of the vehicle 12. Operation of the second electronic control unit 75 concludes by generating a total rear steer command 80, which is the combination of the open loop rear steer command 45 and the closed loop rear steer command 65. The total rear steer command 80 may be calculated using any suitable mathematical algorithm that combines the open loop rear steer command 45 and the closed loop rear steer command 65, and may also include additional vehicle dynamic state data 22 in the calculation of the total rear steer command 80, although such is not required.

Figure 4:
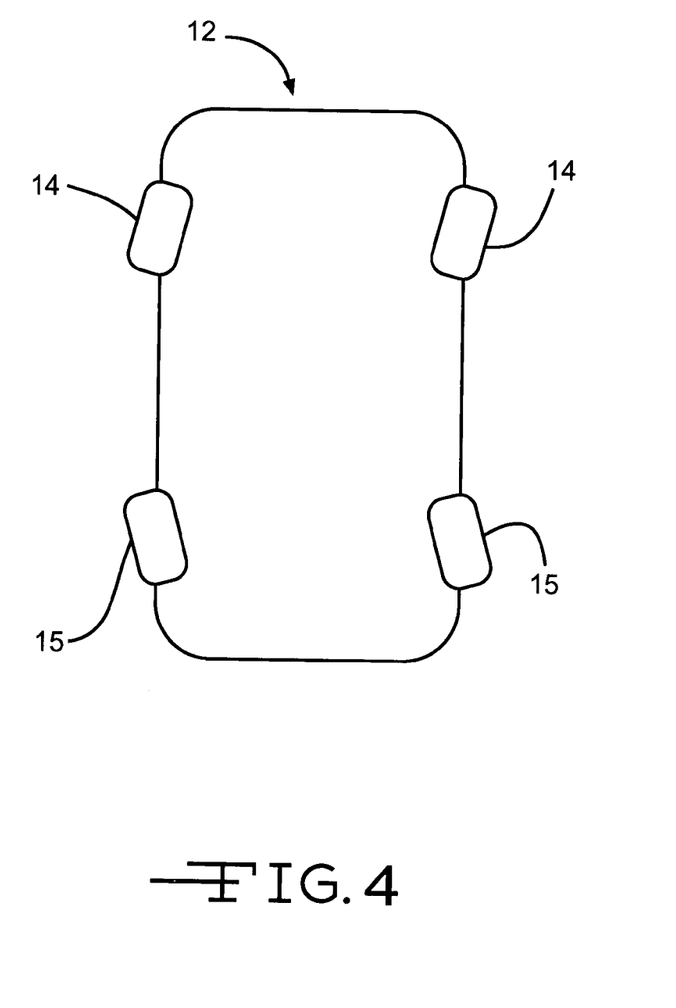
FIGS. 4 and 5 are schematic diagrams showing in phase and out of phase rear wheel steering configurations.
Figure 5:
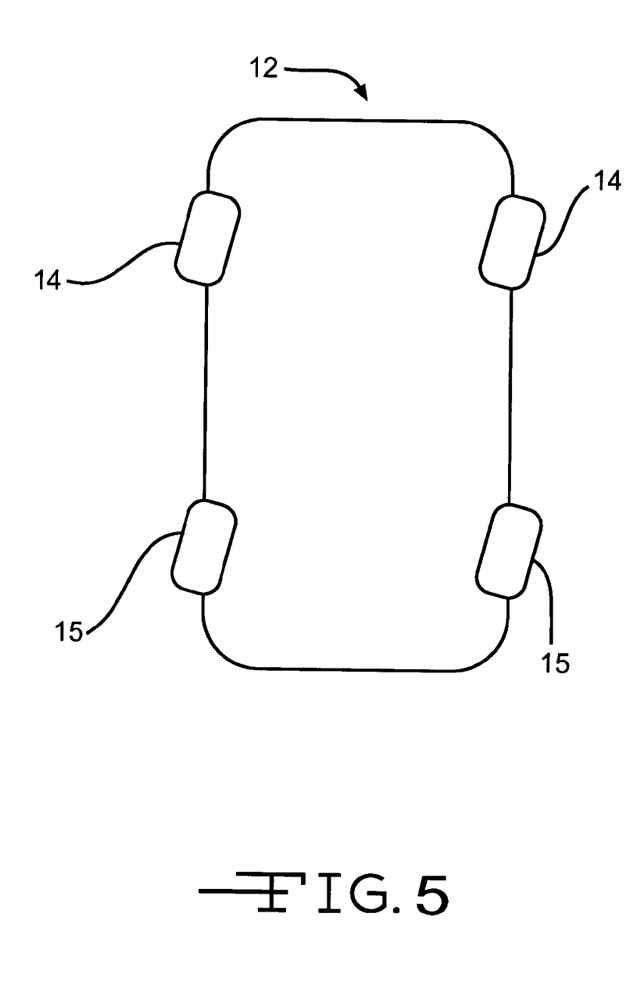

The total rear steer command 80 is transmitted to the RWS actuation mechanisms 108 of the vehicle 12. The total rear steer command 80 may be transmitted to the RWS actuation mechanisms 108 using any suitable data transmission mechanism. The RWS actuation mechanisms 108 perform a series of mathematical comparisons between the desired operational state values for the vehicle 12 provided by the total rear steer command 80 and the actual operational state values of the vehicle 12. In addition to the total rear steer command 80, the RWS actuation mechanisms 108 receive input data from a plurality of sensors that provide operational state data relative to the steering control system 115 of the vehicle. The sensors include a rack position sensor 90 generating a rack position measurement 91, a motor velocity sensor 95 generating a motor velocity measurement 96, and a motor current sensor 105 generating a motor current measurement 106. The RWS actuation mechanisms 108 first generate a motor velocity command 85, which is determined by comparing the actual rack position measurement 91 to the desired total rear steer command 80. The motor velocity command 85 then serves as an input variable in the calculation of a motor current command 100. The motor current command 100 compares the motor velocity command 85 to the actual motor velocity measurement 96. The motor current command 85 is in turn used as an input variable in the calculation of a rear steer motor voltage 110. The rear steer motor voltage 110 compares the desired motor current command 100 to the actual motor current measurement 106. The rear steer motor voltage signal 110 is a measurement of the adjustment of the phase orientation of the steerable rear wheels 15 of the vehicle 12 that is required in order to maintain the desired trajectory of the vehicle 12. FIGS. 4 and 5 illustrate the different phase orientations for the steerable rear wheels 15 of the vehicle 12. Where the rear steer motor voltage signal 110 is a positive value, the steerable rear wheels 15 preferably maintain an in phase orientation, shown in FIG. 5. In phase orientation of the rear wheels 15 refers to the arrangement of the rear wheels 15 that aligns them in the same direction as that of the front wheels 14 in accordance with the front steering angle measurement 21. In phase rear steer provides a supplemental understeer condition for the rear wheels 15, generally at high vehicle speeds, which contributes to maintaining the directional stability of the vehicle 12. Conversely, where the rear steer motor voltage 110 is a negative value, the steerable rear wheels 15 preferably maintain an out of phase orientation, as shown in FIG. 4. Out of phase orientation of the rear wheels 15 refers to the arrangement of the rear wheels 15 where the direction of the rear wheels 15 is generally opposite the direction of the front wheels 14. The degree of contrast between the front wheel 14 position and rear wheel 15 position varies according to the magnitude of the negative rear steer motor voltage 110 to provide a supplemental oversteer condition. The out of phase oversteer orientation is generally suitable for low speed maneuvers of the vehicle 12, such as parking or turning operations.

Figure 3B:
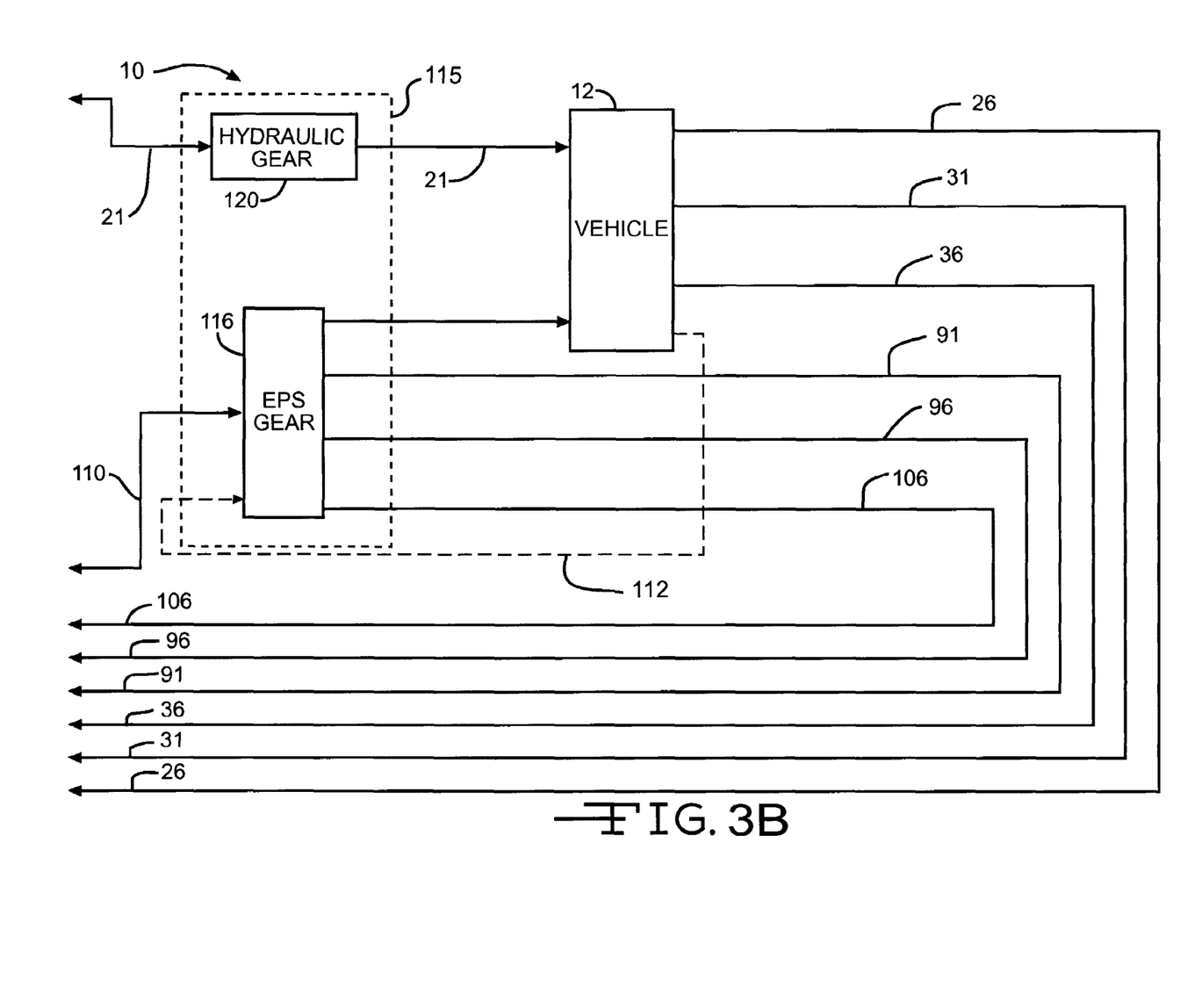
FIG. 3B is a partial schematic diagram showing the mechanical systems that are supplied the output data of the control architecture of the present invention.

FIG. 3B illustrates the application of the output of the control architecture 10 to the control systems of the vehicle 12. The rear steer motor voltage signal 110 is transmitted to the steering control system 115 of the vehicle 12. Preferably, the rear steer motor voltage 110 is processed by the electronic power steering gear 116, which in turn controls the phase orientation of steerable rear wheels 15 of the vehicle 12. It will be appreciated, however, that the rear steer motor voltage signal 110 may be provided to any suitable steering control component capable of altering the rear wheel 15 phase orientation in response to the rear steer motor voltage signal 110. In addition to the rear steer motor voltage signal 110, the steering control system 115 also is impacted by a rear lateral tire force 112. The rear lateral tire force 112 is a reactionary resistance force that is generated by the physical tire adhesion properties of the rear wheels 15 of the vehicle 12. However, because the operational state data provided for determining the rear steer motor voltage signal 110 is a measure of the operation of the steering control system 115, the effects of the rear lateral tire force 112 are incorporated into the degree of steering correction applied using the rear steer motor voltage signal 110. In addition to the calculated rear steer motor voltage signal 110, the front steering angle measurement 21 is also transmitted to the steering control system 115. Preferably, the front steering angle measurement signal 21 is transmitted to a hydraulic gear 120 used for controlling the operator steered front wheels 14.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An integrated vehicle steering and braking control architecture for a vehicle having steerable rear wheels, comprising:
    a steering angle sensor generating a front steering angle measurement signal;
    a vehicle stability control system for controlling selective braking operations of the wheels of the vehicle, said vehicle stability control system generating a vehicle velocity measurement based upon a vehicle dynamic state detected by at least one sensor, said vehicle stability control system also generating a calculated closed loop rear steer command based upon both the vehicle dynamic state and an open loop rear steer command; and
    a rear wheel steering control system for controlling a steering angle of the rear wheels of the vehicle, said rear wheel control system generating said open loop rear steer command based upon the vehicle velocity measurement generated by said vehicle stability control system and upon said front steering angle measurement provided, said open loop rear steer command being transmitted in a feedback operation to said vehicle stability control system, said rear wheel steering control system also generating a rear steer signal that is transmitted to a power steering gear controlling the steering angle of the rear wheels of the vehicle.

2. The control architecture of claim 1 wherein said at least one sensor senses at least one of yaw velocity, yaw acceleration, lateral velocity, lateral acceleration, wheel velocity, and wheel acceleration.

3. An integrated vehicle stability and rear wheel steering control system for controlling a vehicle having a braking system and a steering system comprising:
    a plurality of sensors for generating vehicle dynamics data;
    a first electronic control unit to control vehicle stability control operations of the vehicle, said first electronic control unit generating a plurality of calculated outputs based upon said vehicle dynamics data and an open loop rear steer command;
    a second electronic control unit to control rear wheel steering operations of the vehicle, said second electronic control unit generating a plurality of calculated outputs, including said open loop rear steer command, based upon the calculated outputs of said first electronic control unit and said vehicle dynamics data;
    a communication network connecting said first electronic control unit and said second electronic control unit to transmit said vehicle dynamic data and the calculated outputs of said first electronic control unit to said second electronic control unit in a feed forward communication, and to transmit said open loop rear steer command calculated by said second electronic control unit to said first electronic control unit in a feedback communication; and
    a plurality of devices for controlling said steering system and said braking system in response to the calculated output of said second electronic control unit.

4. An integrated vehicle steering and braking control network architecture for a vehicle, comprising:
    a plurality of sensors that provide vehicle dynamics data to an electronic control unit, a plurality of vehicle stability control devices, and a plurality of rear wheel steering control devices;
    an electronic control unit that performs a vehicle stability control operation by processing the input data of at least one of said sensors as well a second input signal to produce a first calculated output in the form of a measurement of vehicle velocity and a second calculated output in the form of a closed loop rear steer command, and performs a rear wheel steering control operation by processing the input data of at least another one of said sensors as well as said vehicle velocity signal to produce a third calculated output in the form of an open loop rear steer command, said open loop rear steer command being fed back to said vehicle stability control operation as said second input signal, and said open loop rear steer command additionally being further processed by said rear wheel steering control operation in combination with additional vehicle dynamics data provided by at least another one of said sensors to generate a fourth calculated output in the form of desired rear steer motor voltage; and
    a plurality of vehicle stability control devices and rear wheel steering control devices that receive said rear steer motor voltage signal and sensory information from at least one of said sensors to control steering and braking systems of the vehicle.

5. An integrated vehicle steering and braking control architecture for a vehicle with a steering system having one or more operator steered front wheels, one or more steerable rear wheels, and a braking system, comprising:
    a driver-controlled steering input device;
    a steering angle sensor measuring the position of said steering input device and generating a front steering angle measurement;
    a plurality of sensors that provide vehicle dynamics data, said plurality of sensors including:
    a sensor generating a velocity measurement;
    a sensor generating a yaw velocity measurement signal; and
    a sensor generating a lateral acceleration measurement signal;
    a first electronic control unit to control vehicle stability control operation of the vehicle, said first electronic control unit processing said vehicle dynamics data and performing a plurality of intermediate operations, including:

generating a first steering delta signal, said first steering delta signal being the difference between said front steering angle measurement signal and a calculated open loop rear steer command signal;

generating a vehicle velocity estimate signal using said vehicle dynamics data;

passing said first steering delta signal through an input filter along with said vehicle velocity estimate signal, said input filter limiting the maximum rate of change of said first steering delta signal to a velocity-dependent value, which velocity-dependent value is a factor of the magnitude of said vehicle velocity estimate signal;

generating a yaw rate reference signal using an algorithm that generates a series of gain tables using said first steering delta signal, said vehicle velocity estimate signal, and said vehicle dynamics data;

generating a vehicle state error signal by measuring the difference between said yaw rate reference signal and said vehicle dynamic state data;

using said vehicle state error signal as an input to a differential braking subroutine in said first electronic control unit;

generating an error gain signal using an algorithm that combines said vehicle velocity estimate signal and said vehicle dynamic state data; and generating a closed loop rear steer command based upon said error gain signal;

a communication network to transmit said closed loop rear steer command, said open loop rear steer command, said vehicle velocity estimate signal, and said front steering angle measurement;

a plurality of sensors that provide operational state data, said plurality of sensors including:

a sensor generating a rack position measurement;

a sensor generating a motor velocity measurement; and a sensor generating a motor current measurement;

a second electronic control unit that controls rear wheel steering functions of the vehicle, said second electronic control unit performing a plurality of intermediate operations, including:

generating said open loop rear steer command using an algorithm that generates a gain table based upon said vehicle velocity estimate signal, and combines the gain table with said front steering angle measurement;

transmitting said open loop rear steer command through said communication network in a feedback transmission to said first electronic control unit to serve as an input to said closed loop rear steer command;

generating a total rear steer command by summing said open loop rear steer command and said closed loop rear steer command;

generating a motor velocity command by comparing said rack position measurement to said total rear steer command;

generating a motor current command by comparing said motor velocity command to said motor velocity measurement; and generating a rear steer motor voltage by comparing said motor current command to said motor current measurement;

at least one device for controlling the steering system of the vehicle, in response to said rear steer motor voltage; and at least one device for controlling the braking system of the vehicle in response to said vehicle state error signal.

* * * * *